2,854,488

METHOD FOR MAKING 3,4-DICHLOROPHENOL

Alexander H. Widiger, Jr., Midland, Mich., assignor to The Dow Chemical Company, Midland, Mich., a corporation of Delaware No Drawing. Application July 17, 1957
Serial No. 672,346

2 Claims. (Cl. 260—623)

This invention relates to the preparaion of 3,4-dichlorophenol. It pertains specifically to a new method for making 3,4-dichlorophenol that is substantially free of isomeric dichlorophenols by peroxidation of a mixture of 3,4-dichlorocumene and 2,3-dichlorocumene and acidic decomposition of the resulting peroxidate.

By the methods heretofore known for making 3,4-dichlorophenol, it has been difficult to obtain that compound in a form substantially free of isomeric phenols. Methods such as the chlorination of phenol invariably produce a mixture of chlorophenols from which it is difficult to isolate the desired 3,4-dichlorophenol in pure form. Methods such as the diazotization of 3,4-dichloroaniline and decomposition of the diazonium salt permit the preparation of pure 3,4-dichlorophenol only if the required precursor is available in pure form.

It is among the objects of this invention to provide a method for making 3,4-dichlorophenol that is substantially free of isomeric dichlorophenols.

A further object is to provide such a method for making substantially pure 3,4-dichlorophenol by convenient steps and from readily available starting materials.

A more specific object is to provide such a method for making substantially pure 3,4-dichlorophenol from a mixture of 3,4-dichlorocumene and 2,3-dichlorocumene such as is obtained by isopropylation of o-dichlorobenzene.

Other objects and advantages of the invention will be apparent in the following description.

The objects fo the invention have been attained in a new method for making 3,4-dichlorophenol in a form substantially free of isomeric dichlorophenols by peroxidizing with molecular oxygen a mixture consisting essentially of 3,4-dichlorocumene and 2,3-dichlorocumene and decomposing the resulting peroxidate in an acidic aqueous medium.

It has now been discovered, and the discovery forms the basis of the invention, that the peroxidation with molecular oxygen of a mixture of 3,4-dichlorocumene and 2,3-dichlorocumene effects peroxidation principally of the 3,4-dichlorocumene constituent of the mixture, the 2,3-dichlorocumene being substantially inert. When such a peroxidate is decomposed in an acidic aqueous medium, the phenolic product thereby produced consists essentially of 3,4-dichlorophenol, substantially free of 2,3-dichlorophenol, that does not require elaborate purification.

It is already known, e. g. from U. S. Patent 2,719,864 to J. C. Conner, Jr., issued October 4, 1955, that halogenated phenols can be obtained from the corresponding halogenated cumenes. For example, it is known that p-chlorophenol can be obtained by peroxidation of p-chlorocumene and acidic decomposition of the resulting hydroperoxide.

However, it was totally unexpected that peroxidation of a mixture of 3,4-dichlorocumene and 2,3-dichlorocumene results in peroxidation almost exclusively of the 3,4-dichlorocumene constituent of the mixture without substantial reaction of the 2,3-dichlorocumene constituent.

The mixture of 3,4-dichlorocumene and 2,3-dichlorocumene is conveniently obtained in known manner by isopropylation of o-dichlorobenzene in the presence of sulfuric acid or a Friedel-Crafts catalyst such as anhydrous aluminum chloride.

In a typical procedure, propylene gas is passed into liquid o-dichlorobenzene, containing about one percent by weight of anhydrous aluminum chloride catalyst, at a temperature in the range from 20° to 130° C., preferably from 40° to 80° C., until from 0.3 to 0.5 weight-mole of propylene is added per weight-mole of o-dichlorobenzene. The reaction may be carried out at any obtainable pressure. When the reaction is complete, the catalyst is removed or inactivated, e. g. by adding a base such as sodium hydroxide and filtering or by extracting the reaction mixture with aqueous hydrochloric acid. The resulting reaction mixture is then treated, usually by distillation, to separate the unreacted o-dichlorobenzene from the dichlorocumene product.

The dichlorocumene product obtained by isopropylation of o-dichlorobenzene as just described is a mixture of 3,4-dichlorocumene and 2,3-dichlorocumene. In a typical such product there are usually approximately 90 percent by weight of 3,4-dichlorocumene and approximately 10 percent by weight of 2,3-dichlorocumene. Isolation of pure 3,4-dichlorocumene from such mixture is not conveniently accomplished.

It has now been found that it is not necessary to isolate pure 3,4-dichlorocumene from such mixture with 2,3-dichlorocumene in order to obtain subsequently pure 3,4-dichlorophenol. It has now been found that the mixture of 3,4-dichlorocumene and 2,3-dichlorocumene can be peroxidized with molecular oxygen whereby only the 3,4-dichlorocumene is substantially peroxidized, and the resulting peroxidate can then be decomposed in an acidic aqueous medium to produce a phenolic product that consists essentially of 3,4-dichlorophenol and that is substantially free of 2,3-dichlorophenol.

However, it is essential that the starting dichlorobenzene be free from p-dichlorobenzene and that the mixture of 3,4-dichlorocumene and 2,3-dichlorocumene be free from 2,5-dichlorocumene (that would arise by isopropylation of p-dichlorobenzene).

For the present purposes, any mixture consisting essentially of from 80 to 95 percent by weight of 3,4-dichlorocumene and correspondingly from 5 to 20 percent by weight of 2,3-dichlorocumene can be employed with substantially the same results, i. e. to obtain a phenolic product that consists essentially of 3,4-dichlorophenyl.

The step of peroxidizing the mixture of 3,4-dichlorocumene and 2,3-dichlorocumene with molecular oxygen is carried out in a manner analogous to the known peroxidation of cumene, preferably in the presence of an oxidation initiator, e. g. a peroxy compound catalyst, and an alkaline material. A suitable and preferred procedure is to agitate the dichlorocumene fraction, containing an oxidation initiator, with hydrated lime or with about two volumes of an aqueous solution containing a wetting agent and an alkaline buffer, and to bubble a molecular oxygen-containing gas through the reaction mixture. A suitable catalyst, or oxidation initiator, is 0.1 to 1 percent of cumene hydroperoxide, based on the weight of the o-dichlorocumene, or an equivalent amount of a previous batch of dichlorocumene peroxidation reaction mixture. A suitable aqueous solution is one containing, by weight, 0.1 to 1.0 percent sodium lauryl sulfate, 5–10 percent sodium carbonate and 1–5 percent sodium bicarbonate, although other wetting agents and other alkaline buffering agents may be used in place of, or in addition to, those just named. The molecular-oxygen containing gas may be air, pure oxygen or mixtures of oxygen with inert gases. The peroxidation may be carried out under atmospheric or superatmospheric pressure. The reaction with molecular oxygen is usually conducted at an elevated temperature, e. g. 75°–125° C., preferably 80°–110° C., and continued until an appreciable proportion, such as 15–50 percent, of the dichlorocumene has been peroxidized. The alkaline material is then separated from the organic mixture containing the peroxidized dichlorocumene and the unreacted dichlorocumene. The peroxidized dichlorocumene can be separated from the unreacted dichlorocumene, if desired. It is often advantageous to separate the unreacted dichlorocumene from the peroxidized product, e. g. by distillation, because the dichlorocumene thereby recovered is returnable directly to the peroxidation step without extensive repurification such as is usually required of dichlorocumene recovered from a phenolic mixture. Also, the phenolic product obtained by decomposition of a peroxidized material which is substantially free of dichlorocumene is in turn substantially free of dichlorocumene. However, the peroxidized dichlorocumene can be decomposed in the presence of the dichlorocumene and the dichlorophenol product can be recovered from the decomposition mixture in conventional manner.

The peroxidized dichlorocumene can be decomposed substantially to dichlorophenol and acetone in a manner analogous to that known in the art for the decomposition of peroxidized cumene by heating in the presence of a strong mineral acid such as sulfuric acid. For example, the peroxidized dichlorocumene material, e. g. the organic mixture from the peroxidation reaction, can be agitated with from about one-tenth to about an equal volume of aqueous 10–70 percent by weight sulfuric acid at a temperature of 50°–100° C., preferably 55°–75° C., until the peroxidized dichlorocumene therein is substantially converted to the corresponding dichlorophenol. The phenolic product can be separated from the intermediate non-oxidized dichlorocumene, for example, by distillation, by fractional crystallization, or by extraction of the treated oil layer with aqueous caustic and the subsequent acidification of the caustic extract. The non-oxidized dichlorocumene thereby recovered can be treated to free the same of oxidation inhibitors, if necessary, returned to the peroxidation step, and another portion thereof converted to the dichlorophenol.

The phenolic product obtained by acidic decomposition of the peroxidized mixture of 3,4-dichlorocumene and 2,3-dichlorocumene as just described consists essentially of 3,4-dichlorophenol. The recovered unreacted dichlorocumene consists essentially of a mixture of 3,4-dichlorocumene and 2,3-dichlorocumene in which the proportion of 2,3-dichlorocumene is greater than in the starting mixture that was subjected to peroxidation. When the 2,3-dichlorocumene in such recovered dichlorocumene becomes objectionably large, the dichlorocumene mixture can be returned to the isopropylation reaction mixture where, under conditions conducive to isopropylation of o-dichlorobenzene, a substantial part of the 2,3-dichlorocumene is isomerized to 3,4-dichlorocumene.

The following example illustrates the invention but should not be construed as limiting its scope.

*Example*

Into a reactor equipped with an agitator, reflux condenser and a dip pipe were charged 1700 grams (11.5 gram-moles) of o-dichlorobenzene and 13 grams of anhydrous catalytic aluminum chloride. Propylene gas was passed into the reaction mixture through the dip pipe, with continued agitation of the reaction mixture, over a period of about four hours during which the temperature of the reaction mixture was maintained at from 55° to 73° C. The rate of addition of propylene was such that after about four hours the weight of the reaction mixture had increased by 172 grams, corresponding to about 4.09 gram-moles of propylene, whereupon the addition of propylene was discontinued. Thereafter, the catalyst was removed from the organic mixture by washing with four 250-milliliter portions of 10 percent by weight hydrochloric acid followed by one similar wash with water. A few drops of 50 percent by weight sodium hydroxide were added to the organic mixture and the latter was distilled through a short distillation column. A first fraction, consisting substantially of o-dichlorobenzene, was taken off up to a distillation temperature of about 181° C. at atmospheric pressure and amounted to about 986 grams. A second fraction, taken at distillation temperatures between 80° and 110° C. under 1.0 inch of mercury absolute pressure, amounted to about 374 grams and was principally o-dichlorobenzene with dichlorocumene. A middle fraction of 422 grams was taken up to a distillation temperature of 165° C. under 1.0 inch of mercury absolute pressure and contained the bulk of the isopropylated o-dichlorobenzene product. A residue of about 55 grams remained. The middle fraction of 422 grams of isopropylated o-dichlorobenzene was redistilled through a highly efficient fractionating column under 25 mm. of mercury, absolute pressure. A first fraction of about 15 grams and consisting principally of o-dichlorobenzene was removed. Thereafter followed a main fraction of dichlorocumene, boiling at a distillation temperature of about 125°–127° C. under 22 mm. of mercury absolute pressure and amounting to about 278 grams. A residue of about 129 grams, largely dichlorodiisopropylbenzene, remained.

The main fraction of dichlorocumene was analyzed by infrared spectroscopy and found to consist essentially of approximately 90 percent by weight of 3,4-dichlorocumene and approximately 10 percent by weight of 2,3-dichlorocumene. The process of isopropylation of o-dichlorobenzene was repeated several times to obtain a mixture consisting essentially of 3,4-dichlorocumene and 2,3-dichlorocumene in the proportions just stated.

Into a 3-necked glass reactor, equipped with an agitator, thermometer, dip pipe for introduction of oxygen, and a reflux condenser, was charged 4000 cc. of dichlorocumene of a kind prepared as just described, i. e. consisting essentially of approximately 90 percent by weight of 3,4-dichlorocumene and approximately 10 percent by weight 2,3-dichlorocumene. Also charged to the reactor were 15 grams of hydrated lime and 200 cc. of a peroxidized 3,4-dichlorocumene obtained in a previous run and containing 17.9 percent by weight of dichlorocumene hydroperoxide. The resulting mixture was stirred and heated to a temperature of about 85° C. Oxygen gas was bubbled through the reaction mixture at a rate of about 40–90 cc. per minute (in excess, the unreacted gas being vented through the reflux condenser) for a period of about 44.5 hours during which the temperature was maintained between 85° and 90° C. The resulting reaction product was analyzed and found to contain peroxidized dichlorocumene in amount which, when computed as dichlorocumene hydroperoxide, was equivalent to 15.8 percent by weight of the reaction product.

The organic reaction product was decanted from the settled lime.

Into a mixture of 500 cc. of water and 375 cc. of concentrated (95 percent by weight) sulfuric acid, with agitation and at a temperature of about 60° C., there was slowly added 4859 grams of the peroxidized dichlorocumene obtained as described above and containing 15.8 percent by weight of peroxidized material computed as dichlorocumene hydroperoxide. The addition was made over a period of about 3 hours and the mixture was thereafter agitated for a further 5-hour period at a temperature about 60° C. The mixture was then cooled to room temperature and the layers were allowed to separate. The aqueous layer was withdrawn. The organic oil layer was extracted eight times with 250-cc. portions of aqueous 5 percent by weight sodium hydroxide solution. The combined caustic extracts were then washed with three 100-cc. portions of benzene and the aqueous solution was acidified with hydrochloric acid. The phenolic layer was withdrawn and the aqueous acid-salt layer was extracted with three 100-cc. portions of benzene, the benzene extract being added to the phenolic product. Upon evaporation of benzene from this extract, there was obtained the entire phenolic product of the hydrolysis reaction. A representative sample of this phenolic product was analyzed and was found to consist essentially of 3,4-dichlorophenol. One hundred parts by weight of a representative portion of the phenolic product was fractionally distilled under reduced pressure to obtain (1) 4 parts by weight of a fore-cut distillate fraction comprising approximately 75 percent by weight of 3,4-dichlorophenol together with lower boiling impurities, (2) 94 parts by weight of a main distillate fraction consisting essentially of 3,4-dichlorophenol and having a freezing point of 65.2° C., and (3) 2 parts by weight of undistilled residue comprising approximately 50 percent by weight of 3,4-dichlorophenol together with higher-boiling impurities. The distillate forecut (1) contained approximately 10 percent by weight of 2,3-dichlorophenol, corresponding to 0.4 percent by weight of the phenolic product subjected to distillation.

The oil layer from which the phenolic product of the hydrolysis reaction had been extracted by means of aqueous sodium hydroxide was distilled, whereby there was recovered substantially all of the starting dichlorocumene that was not oxidized in the peroxidation step. The recovered dichlorocumene contained approximately 11.5 percent by weight of 2,3-dichlorocumene, i. e. substantially all of the 2,3-dichlorocumene that was contained in the starting mixture of dichlorocumenes which was subjected to peroxidation.

This application is a continuation-in-part of a copending patent application, Serial No. 415,449, filed March 10, 1954, and now abandoned.

That which is claimed is:

1. A method for making 3,4-dichlorophenol which comprises peroxidizing a mixture consisting essentially of 3,4-dichlorocumene and 2,3-dichlorocumene by contacting the same with molecular oxygen in the presence of alkali and in the presence of a catalytic proportion of a peroxy compound oxidation initiator at a temperature between 75° and 125° C. until the mixture contains an appreciable proportion of peroxidized dichlorocumene, decomposing the peroxidized dichlorocumene by contacting the same with aqueous sulfuric acid at a temperature between 50° and 100° C., and separating from the resulting reaction mixture the phenolic product of the reaction, in which product the phenolic constituent consists essentially of 3,4-dichlorophenol.

2. A method for making 3,4-dichlorophenol which comprises peroxidizing a mixture consisting essentially of from 80 to 95 percent by weight of 3,4-dichlorocumene and correspondingly from 5 to 20 percent by weight of 2,3-dichlorocumene by contacting the same with molecular oxygen in the presence of alkali and in the presence of a catalytic proportion of a peroxy compound oxidation initiator at a temperature between 75° and 125° C. until the mixture contains an appreciable proportion of peroxidized dichlorocumene, separating from the resulting reaction mixture a fraction that consists essentially of the peroxidized dichlorocumene product of the reaction, decomposing the peroxidized dichlorocumene product fraction by contacting the same with aqueous sulfuric acid at a temperature between 50° and 100° C. and thereby obtaining a phenolic reaction product in which the phenolic constituent consists essentially of 3,4-dichlorophenol.

References Cited in the file of this patent

UNITED STATES PATENTS

| 2,638,464 | Reynolds et al. | May 12, 1953 |
| 2,719,864 | Conner | Oct. 4, 1955 |